United States Patent [19]
Menard et al.

[11] Patent Number: 5,807,518
[45] Date of Patent: Sep. 15, 1998

[54] FRICTION MATERIAL DESIGNED FOR FITTING TO A DEVICE EMPLOYING FRICTION IN A LIQUID MEDIUM, AND THE METHOD OF PRODUCING SUCH A FRICTION MATERIAL AND THE DEVICE TO WHICH IT IS FITTED

[76] Inventors: Denis Menard, 90 Avenue E. Ruben, 87000 Limoges; Jean-Pierre Boutaud, 12 rue Jules Vallés, 87350 Panazol; Richard Guerin, 14 rue Henri Laforest, 61100 Flers; Gérard Jacq, La Foucaudière, 61430 Athis De L'Orne, all of France

[21] Appl. No.: 553,573

[22] PCT Filed: Mar. 6, 1995

[86] PCT No.: PCT/FR95/00320

§ 371 Date: Nov. 27, 1995

§ 102(e) Date: Nov. 27, 1995

[87] PCT Pub. No.: WO95/26473

PCT Pub. Date: Oct. 5, 1995

[30] Foreign Application Priority Data

Mar. 25, 1994 [FR] France ................... 94 03518

[51] Int. Cl.$^6$ .............. F16D 69/02; D04H 1/48
[52] U.S. Cl. ............ 264/258; 264/259; 264/297.4; 156/184; 156/242; 156/250; 156/305
[58] Field of Search ............... 442/60, 59, 374, 442/375, 376, 380, 388, 391, 392; 428/66.2; 523/149, 152, 153, 155, 157, 158, 159; 2/107; 156/184, 242, 250, 305, 227; 264/258, 259, 297.4; 188/251 A; 192/107 M

[56] References Cited

U.S. PATENT DOCUMENTS

| | | |
|---|---|---|
| 2,733,797 | 2/1956 | Almen et al. . |
| 3,936,552 | 2/1976 | Krupp et al. ................. 428/64 |
| 3,971,669 | 7/1976 | Wrzesien et al. ............. 156/148 |
| 4,130,537 | 12/1978 | Bohrer ........................ 260/38 |
| 4,369,263 | 1/1983 | Matsushima et al. .......... 523/152 |
| 4,374,211 | 2/1983 | Gallagher et al. ............. 523/156 |
| 4,743,643 | 5/1988 | Royer ........................ 523/150 |
| 4,775,705 | 10/1988 | Parker et al. ................. 523/153 |
| 4,785,029 | 11/1988 | Honma et al. ................ 523/153 |
| 4,790,052 | 12/1988 | Olry ........................... 28/110 |
| 4,836,507 | 6/1989 | Yang .......................... 264/143 |
| 4,861,809 | 8/1989 | Ogawa et al. ................. 523/149 |
| 4,895,882 | 1/1990 | Asano et al. .................. 523/145 |
| 5,273,819 | 12/1993 | Jex ............................ 428/297 |
| 5,304,225 | 4/1994 | Gardziella et al. ............. 51/298 |

FOREIGN PATENT DOCUMENTS

| | | |
|---|---|---|
| 0 223 642 | 10/1985 | European Pat. Off. . |
| 0 451 320 A2 | 10/1991 | European Pat. Off. . |
| 0 530 741 A1 | 3/1993 | European Pat. Off. . |
| 2935205 A 1 | 4/1991 | Germany . |
| 3231310 A 1 | 2/1994 | Germany . |
| 601903 | 5/1948 | United Kingdom . |
| 742043 | 12/1955 | United Kingdom . |

OTHER PUBLICATIONS

JP910071291/92–410457 Derwent abstract, 29 Oct. 1992
International Search Report, 28 Jun. 1995.

*Primary Examiner*—Kathleen Choi
*Attorney, Agent, or Firm*—Morgan & Finnegan, L.L.P.

[57] ABSTRACT

A friction material for a liquid medium consists of a fibre mat impregnated with a thermosetting resin, the fibres having a length of at least 12 mm. The method of producing such a material includes the steps of providing a mixture of fibres, carding the mixture to form a card web, lapping the card web, needling the lapped card web for form a needled mat and impregnating the needled mat with a thermosetting resin.

6 Claims, 4 Drawing Sheets

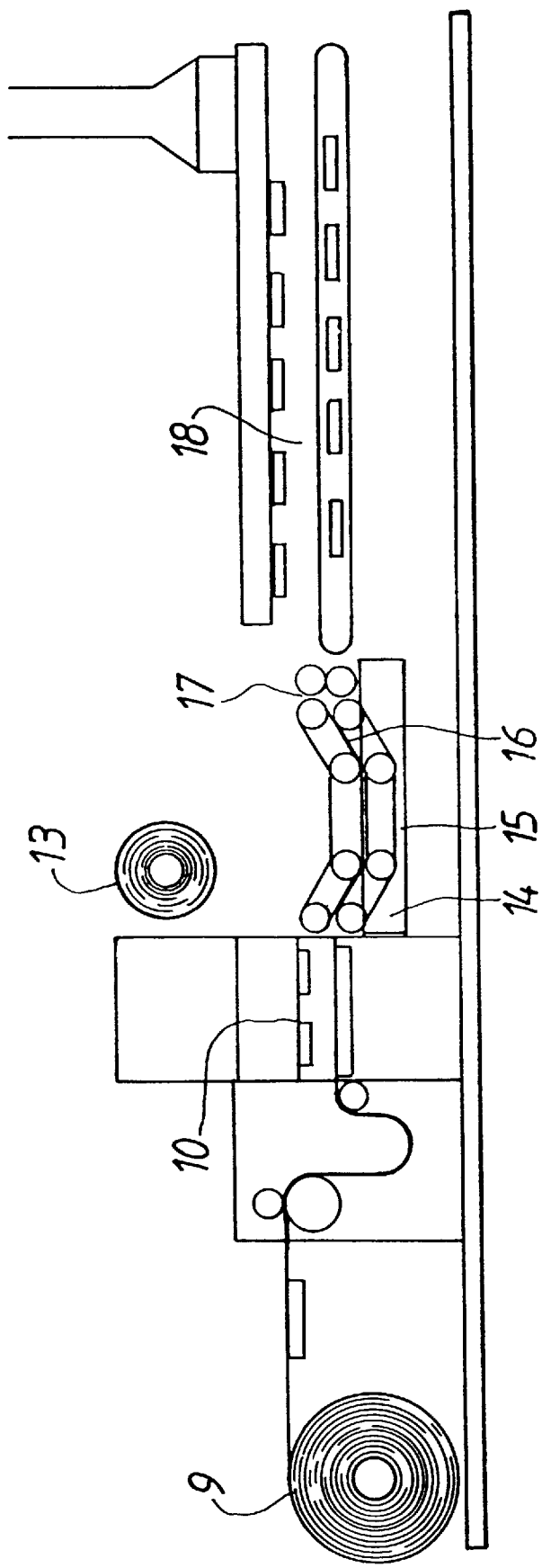

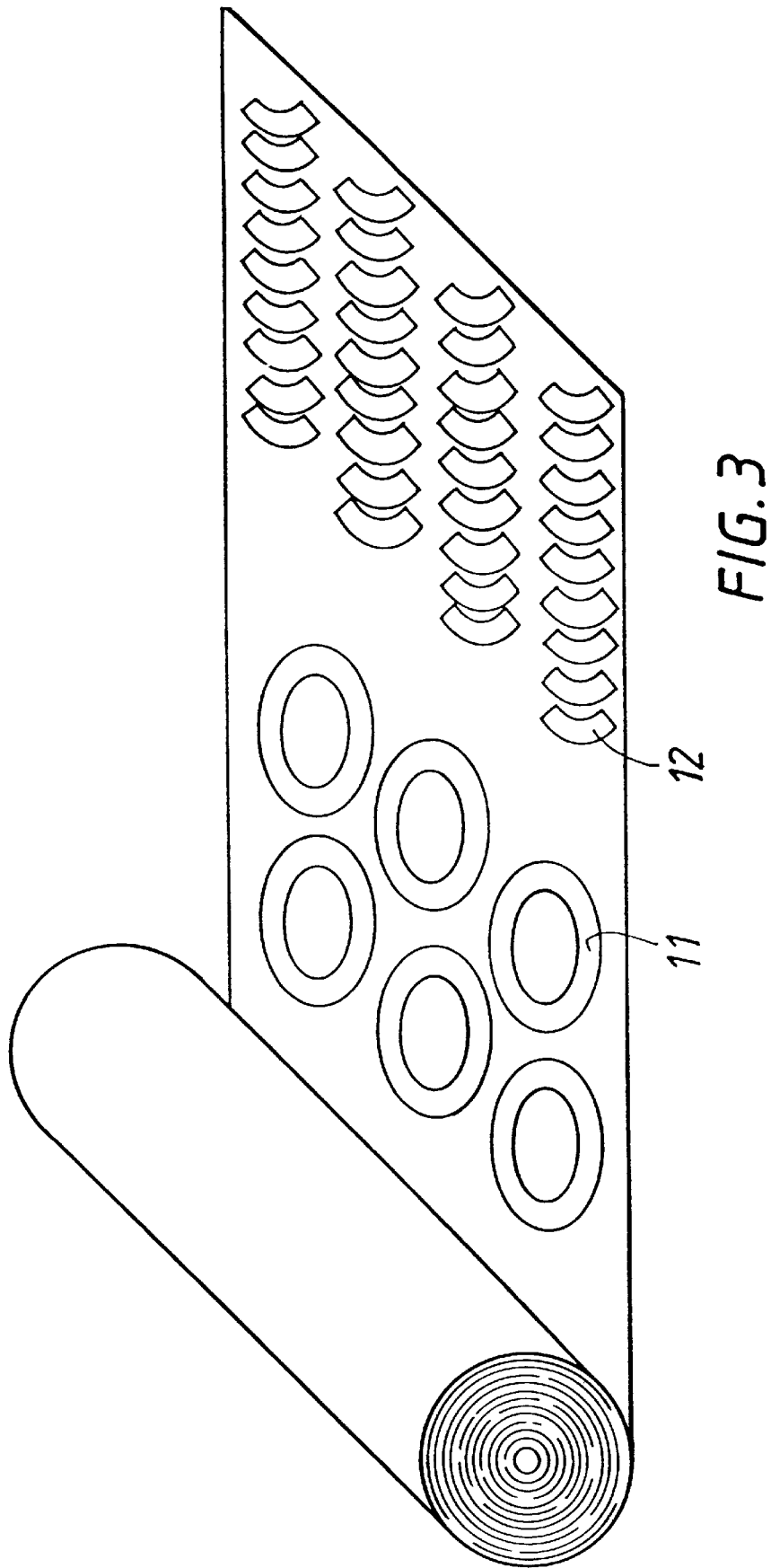

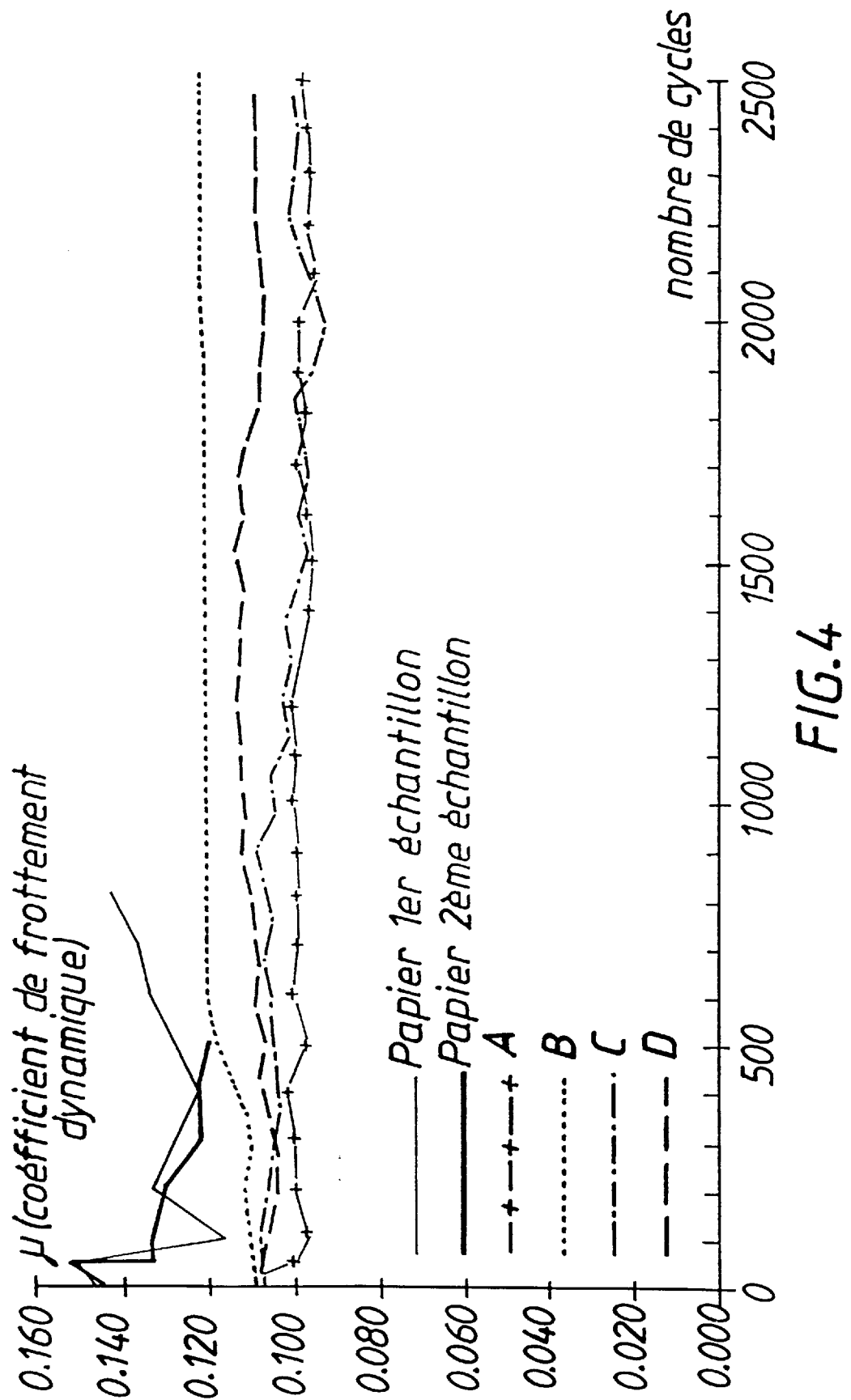

FRICTION MATERIAL DESIGNED FOR FITTING TO A DEVICE EMPLOYING FRICTION IN A LIQUID MEDIUM, AND THE METHOD OF PRODUCING SUCH A FRICTION MATERIAL AND THE DEVICE TO WHICH IT IS FITTED

This application is a national stage application filed under 35.U.S.C.37/ of PT/FR95/00320 on Mar. 6, 1995.

FIELD OF THE INVENTION

The present invention relates to a friction material designed for fitting to a device using friction in a liquid medium, and the method of producing such a friction material and the device to which it is fitted.

More particularly, such a friction material takes the form of a flat ring or a truncated cone and the device to which it is fitted is a clutch or brake disc, notably for an automatic gear box or associated therewith, operating in oil, or a synchronisation ring or cone for a manually-operated gearbox also operating in oil, such a device being installed in a vehicle.

BACKGROUND OF THE INVENTION

The friction materials used up to now for the aforementioned applications are of three types: materials of the paper type, sintered materials and graphite-containing moulded materials.

The materials of the paper type consist essentially of cellulose fibres impregnated with resin.

Such materials are obtained by a wet method using a normal paper-making process, that is to say by dispersing cellulose fibres in an aqueous solution containing a resin, then spinning and drying.

Such a method necessarily involves using short fibres, with an average length below one millimeter.

Materials of this type have the drawback of degrading very rapidly as soon as their temperature reaches 150° C., which is the case when the device that is equipped with the friction material must, within a small space, transmit or absorb high torques at speeds which, in practice, are growing ever higher.

This situation now arises by virtue of, on the one hand, the increasing power of thermal engines and, on the other hand, the reduction in the size of the devices for transmitting engine torque, which make it necessary to increase the gripping pressure of the friction devices.

Sintered materials do not exhibit the above described drawback but, unlike with materials of the paper type, the coefficients of friction obtained are low.

Moreover, these materials generate damaging vibrations and noises.

Materials of the graphite-containing moulded type have a relatively high cost and do not permit stable transmission of a torque.

SUMMARY OF THE INVENTION

The aim of the invention is to overcome the aforementioned drawbacks by proposing a friction material for a liquid medium which has in particular a high, stable coefficient of friction, a high resistance to heating at high working pressures, and good resistance to wear.

A friction material for a liquid medium, according to the invention, is characterized in that it consists of a mat of fibres impregnated with a thermosetting resin, and in that the fibres have a length of at least 12 mm.

According to other characteristics taken separately or in combination:

the average length of the fibres is at most 120 mm;

the fibres are chosen from amongst the group of fibres of glass, wool, cotton, ceramic, polyacrylonitrile, preoxidized polyacrylonitrile and aramid;

fillers in powder form are incorporated into the mat, comprising all or some of the following elements or compounds: copper, rockwool, carbon (coke and/or reduced-powder carbon fibres, graphite), zirconium silicate, iron sulphide, alumina, rubber and diatoms;

fillers in the form of pulps are incorporated into the mat, comprising all or some of the following compounds: pulps of glass, aramid, acrylic and phenolic fibres;

the resin of the thermosetting type includes a polar solvent, preferably aqueous;

the thermosetting resin has latex and/or fillers in powder form added to it which comprise all or some of the following elements or compounds: copper, rockwool, carbon (coke and/or reduced-powder carbon fibres, graphite), zirconium silicate, iron sulphide, alumina, rubber and diatoms.

The method of producing the friction material according to the invention is characterized by the following steps:

a) a mixture of fibres of the same nature or of different natures as defined above is produced in a mixer;

b) the mixture is carded to form a card web;

c) the card web is lapped;

d) the lap thus formed is needled;

e) the needled mat is impregnated with a thermosetting resin and;

f) the impregnated mat is dried.

According to other characteristics taken independently or in combination:

between steps b) and c) above, fillers in powder form as defined above are sprinkled on the card web;

before step e) the thermosetting resin has fillers as defined above added to it;

step e) is preceded by an operation of impregnation of the needled mat by means of a dilution or dispersion in a liquid of the fillers as defined above;

the carding is effected by means of a wool-type card;

the needling operation is preceded by a preliminary needling operation;

the resin impregnation is effected by soaking in a tank containing the resin in solution or dispersed in water;

drying is preceded by a squeezing or hydroextraction operation;

after or during drying, the mat is wound up.

As a variant, the method is characterized by the following operations;

a) a mixture of fibres of the same nature or of different natures, as defined above, is produced in a mixer;

b) the mixture is carded to form a card web;

c') fillers in powder form as defined above, and a resin in powder form, are sprinkled on the card web;

d') the mat is pressed while being brought to an appropriate temperature to ensure the flow of the resin.

In order to produce a device coated with friction material, the method according to the invention is as follows:

g) a ring, or as a variant a plurality of sectors forming a ring, is cut out from the mat produced as indicated above;

i) the ring or plurality of sectors forming a ring is placed in the bottom of a mould;

j) a metal support is placed in the mould on the ring or on the plurality of sectors forming a ring;

k) where appropriate, a second ring or a plurality of sectors forming a ring is placed on the metal support, opposite the ring or the said plurality of sectors forming a ring;

l) the mould is closed, shims being disposed so as to control and limit the movement of a piston-closing the mould;

m) heating under pressure is effected in the mould, thereby also ensuring the adhesion of the said ring, and where applicable of the said second ring, to the metal support;

n) the mould is opened and the device covered with the friction material is cooled.

As a variant, step g) is replaced by a step h) identical thereto, but conducted between steps d) and e) above.

According to other characteristics of the invention, taken independently or in combination:

the mould and piston have a flat bottom;

the bottom of the mould is grooved;

the mould and the piston are in the shape of a truncated cone;

the shims limiting the movement of the piston are sized so that the porosity of the friction material is between 20% and 70%;

the heating temperature is between 130° C. and 220° C.

Other characteristics and advantages of the product and of the method will appear from a reading of the description that follows, of example embodiments and implementations of the invention, in relation to the accompanying drawings.

BRIEF DESCRIPTION OF THE DRAWINGS

FIG. 2 is a functional diagram of a second part of this installation;

FIG. 3 is a diagram illustrating the cutting out of friction rings and sectors;

FIG. 4 is a series of graphs summarizing the results of comparative tests.

DESCRIPTION OF THE PREFERRED EMBODIMENTS

Figure 1:
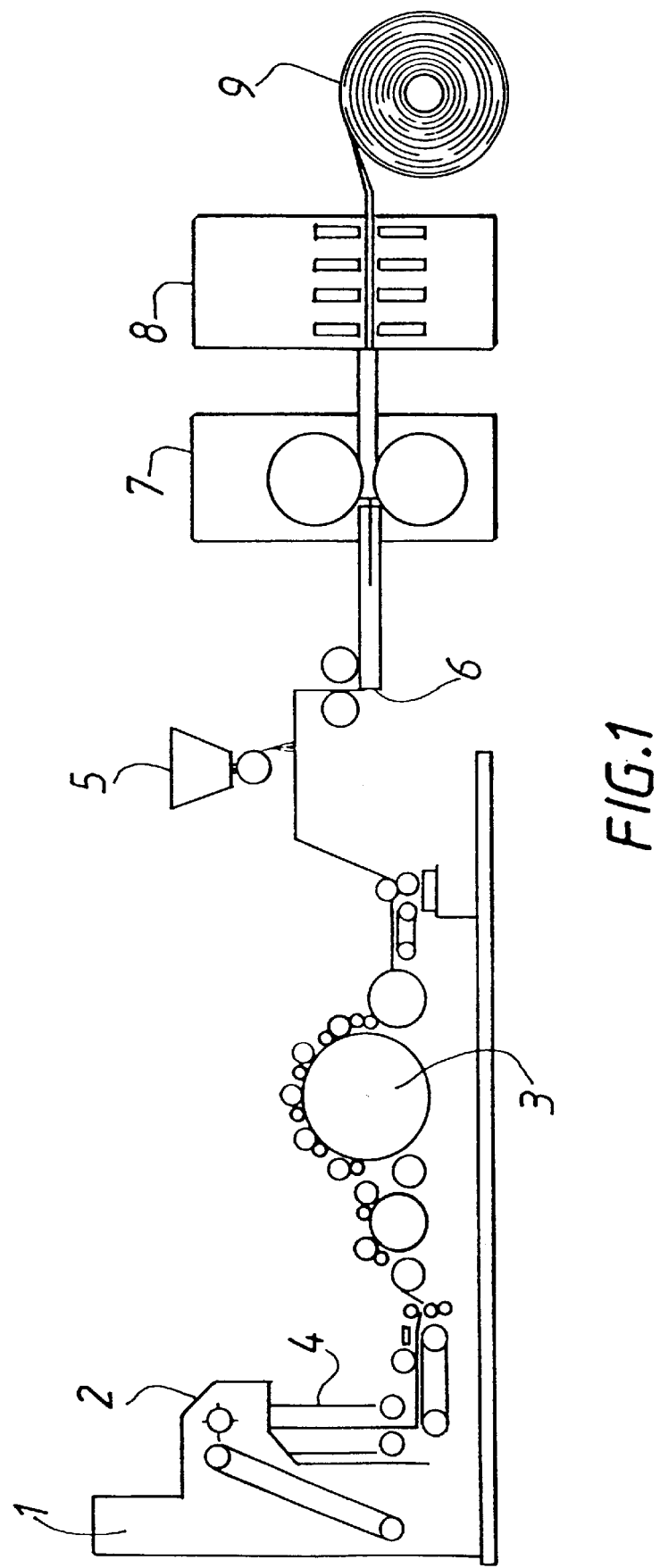
FIG. 1 is a functional diagram of a first part of the installation designed for the implementation of the method according to the invention.

Four fibre mats (examples A, B, C, D) are produced from the following compositions by weight of fibres:

|  |  | EXAMPLES | | | |
|---|---|---|---|---|---|
| FIBRES |  | A | B | C | D |
| GLASS | Parts | 20 | — | 20 | — |
| COTTON | Parts | — | 30 | — | — |
| CERAMIC | Parts | 10 | 10 | 10 | — |
| PAN (polyacrylonitrile or preoxidized) | Parts | 10 | — | 10 | 20 |

The average length of the fibres used is as follows:
glass fibres: 50 mm;
cotton fibres: 18 mm;
ceramic fibres: 12 mm;
PAN fibres: 42 mm.

Referring to FIG. 1, the above fibres or mixtures of fibres, produced in a mixer, are introduced into the hopper 1 (FIG. 1) of a feed device 2 for a wool-type card 3 which has a feed chute 4.

In examples Card D, filler in powder form are sprinkled at the discharge from the card 3, on the card web formed, by means of a sprinkling device 5.

The fillers in powder form have the following composition (composition by weight referred to the parts by weight of the above fibres):

|  | EXAMPLES | | | |
|---|---|---|---|---|
| Fillers IN POWDER FORM | A | B | C | D |
| COPPER | — | — | — | 10 |
| POWDERED ROCKWOOL | — | — | — | 10 |
| GRAPHITE | — | — | 10 | — |
| COKE | — | — | 10 | — |

The card web is then lapped by means of a lapper 6, and the lap thus formed undergoes a needling process in two phases: preliminary needling by a preliminary needler with rollers 7 and needling by a needler 8.

The mat of needled nonwoven material thus produced is, in the example depicted, wound on a roll 9 at the discharge from the first part of the installation.

The roll 9 is carried into a second part of the installation shown in FIG 2, and is paid out for the remainder of the process of producing a friction material.

As a variant (not shown), the second part of the installation follows immediately on from the first part and the needled nonwoven mat is not wound up.

The needled mat is fed into a cutting station 10 where rings 11 or sectors 12 as depicted in FIG. 3 or any other shape that the friction material is to take are cut out.

The part of the mat that is not cut out, also called a skeleton, is directed to a winder 13, for subsequent recycling.

The cut-out shapes 11 or 12 are conveyed into an impregnating bath 14 containing one or more resins of the thermosetting type in solution or dispersed in water.

The impregnating bath 14 is of the following composition by weight, expressed in parts, in a manner consistent with the proportions indicated previously for fibres and fillers.

|  | EXAMPLES | | | |
|---|---|---|---|---|
| IMPREGNATING BATH | A | B | C | D |
| WATER-BASED RESIN | 60 | 60 | — | — |
| RESOL-BASED RESIN | — | — | 40 | 60 |

In general, the following types of resin can be used:
phenolic plastic resins (resol or novolak);
aminoaldehyde resins (urea formaldehyde, melamine formaldehyde or combinations thereof);
epoxy (epoxide) resins;
polyimide resins.

At the end of impregnation, squeezing takes place, firstly in the bath (conveyor 16) and outside the bath (rollers 17).

As a variant, not shown, the cut-out shapes 11, 12 undergo, after soaking in the impregnating bath, a hydroextraction operation.

The cut-out shapes 11, 12 are then introduced into an infrared drying tunnel 18, and then packaged.

As a variant, the operation of cutting out the shapes is carried out after impregnation, squeezing and/or hydroextraction and drying.

In the latter case, the impregnated mat can be wound up in order to be transported to a cutting station as shown in FIG. 3.

Each cut-out shape, a ring or plurality of sectors forming a ring, is placed in a mould which has, depending on the equipment for which the friction material is intended, a bottom which is flat or in the form of a truncated cone or any other shape, grooved or otherwise.

A metal support is placed in the mould on the ring or plurality of sectors forming a ring.

Where appropriate, a second ring or a plurality of sectors forming a ring is placed on the metal support, opposite the said ring or the plurality of sectors forming a ring.

The mould is closed, shims being disposed so as to control and limit the movement of a piston closing the mould.

Heating under pressure is effected in the mould, which moreover ensures the adhesion of the ring, and where applicable of the second ring, to the metal support.

The mould is opened and the device coated with the friction material is cooled.

Advantageously, the shims limiting the movement of the piston are sized so that the porosity of the friction material is between 20% and 70% and the heating temperature is between 130° C. and 220° C.

In order to effect comparative tests with a known friction material of the paper type, two samples of friction material (clutch disc) are produced with the following composition by weight:

cellulose fibres: 30% (length: 2 to 20 mm);
phenolic resin: 31%
diatoms: 23%
aramid fibres: 10% (length: 6 to 20 mm)
quartz: 5%
sodium sulphate: 1%

Four series of three clutch friction discs produced in accordance with the invention from the compositions of the above examples A, B, C and D and two series of three clutch friction discs of the paper type having the above compositions underwent endurance tests under the conditions indicated hereinafter.

Three discs from the same series, corresponding to the same embodiment, were placed in a testing machine of the type defined by the standard SAE II (US standard).

The test was effected in an oil bath brought to 114° C. A circulation of oil was also provided with a flow rate of between 2 and 3 liters per minute.

The test included three series of cycles.

Each cycle consisted of braking, until it stopped, a centrifugal mass previously launched at a rotation speed of 3600 revolutions per minute.

After each cycle the centrifugal mass was relaunched at the speed indicated above.

A 30 second time interval was provided between each cycle start.

The first series comprised 50 cycles where the unit-area pressure of the gripping of the discs was 0.5 Mpa, the inertia being 0.213 $m^2$.kg.

The second series comprised 2400 cycles where the unit-area pressure of the gripping of the discs was 1.5 Mpa, the inertia being 0.501 $m^2$.kg.

The third series was identical to the first.

The graphs in FIG. 4 represent the evolution of the dynamic friction coefficient of each of the six samples during the endurance cycles defined previously.

It will be observed that at between 500 and 800 cycles, a paper lining is destroyed while the friction material according to the invention remains intact after 2500 cycles (end of tests).

Furthermore, a remarkable stability will be observed in the coefficient of friction of the material according to the invention during the cycles, at a level very close to that of a paper-type material.

Variant embodiments can be used.

In particular, fillers in the form of pulps can be incorporated into the mat, notably pulps chosen from amongst the group of pulps of glass, aramid, acrylic and phenolic fibres.

It is, moreover, entirely possible to incorporate the fillers into the liquid resin instead of, or in addition to, sprinkling them onto the mat.

The fillers can also be diluted or dispersed in a suitable liquid constituting a first impregnating bath for the mat, a second impregnation then being provided so as to ensure the addition of resin.

Furthermore, it is possible to use a solid resin, in the form of a powder, which is sprinkled onto the mat at the same time as the fillers. This mat is then pressed to the correct thickness at 60° C. for 2 secs; in this variant, there is no needling or impregnation.

We claim:

1. A method of producing a friction material, comprising the steps of:
   a) providing a mixture of fibres;
   b) carding the mixture to form a card web;
   c) lapping the card web to form a lapped card web;
   d) needling the lapped card web to form a needled mat;
   e) impregnating the needled mat with a thermosetting resin to form an impregnated mat;
   f) squeezing the impregnated mat; and
   g) drying the impregnated mat.

2. A method of producing a friction material comprising the steps of:
   a) providing a mixture of fibres;
   b) carding the mixture to form a card web;
   c) sprinkling fillers in powder form and a resin in powder form on the card web, said fillers being selected from the group consisting of copper, rockwool, carbon, zirconium silicate, iron sulphide, alumina, rubber and diatoms;
   d) lapping the card web to form a mat: and
   e) pressing the mat while said mat is being brought to a temperature which ensures a flow of the resin.

3. A method according to claim 2, further comprising the step of cutting a ring out from the mat.

4. A method of producing a friction material, comprising the steps of:
   a) providing a mixture of fibres;
   b) carding the mixture to form a card web;
   c) lapping the card web to form a lapped card web;
   d) needling the lapped card web to form a needled mat;
   e) impregnating the needled mat with a thermosetting resin to form an impregnated mat;
   f) hydroextracting the impregnated mat; and
   g) drying the impregnated mat.

5. A method according to claim 2, wherein said mixture is a mixture of different fibres.

6. A method according to claim 2, further comprising the step of cutting a plurality of sectors out from the mat, each of said sectors comprising a portion of a ring.

* * * * *